US012771016B2

(12) United States Patent
Liu et al.

(10) Patent No.: US 12,771,016 B2
(45) Date of Patent: Oct. 20, 2026

(54) WATER SURFACE FLOATING TYPE ELECTROMAGNETIC WAVE SIGNAL RELAY DEVICE

(71) Applicant: DIVEVOLK PTE. LTD., Singapore (SG)

(72) Inventors: Songdong Liu, Zhuhai (CN); Jinsong Liu, Zhuhai (CN); Zhili Chen, Zhuhai (CN); Duo Qin, Zhuhai (CN); Bing Huang, Zhuhai (CN); Kai Zhang, Zhuhai (CN)

(73) Assignee: DIVEVOLK PTE. LTD., Singapore (SG)

( * ) Notice: Subject to any disclaimer, the term of this patent is extended or adjusted under 35 U.S.C. 154(b) by 174 days.

(21) Appl. No.: 18/939,651

(22) Filed: Nov. 7, 2024

(65) Prior Publication Data

US 2025/0158272 A1 May 15, 2025

(30) Foreign Application Priority Data

Nov. 9, 2023 (CN) ......................... 202311488418.7

(51) Int. Cl.
*H01Q 1/34* (2006.01)
*H01Q 1/42* (2006.01)
*H01Q 1/52* (2006.01)

(52) U.S. Cl.
CPC ................. *H01Q 1/34* (2013.01); *H01Q 1/42* (2013.01); *H01Q 1/526* (2013.01)

(58) Field of Classification Search
CPC ............ H01Q 1/34; H01Q 1/42; H01Q 1/526; H01Q 1/12; H01Q 1/22; B63B 35/44;
(Continued)

(56) References Cited

U.S. PATENT DOCUMENTS 3,946,391 A * 3/1976 Cuckler ................... H01Q 1/34 343/792
5,143,459 A * 9/1992 Plutt .................. G11B 19/2009 384/537
(Continued)

FOREIGN PATENT DOCUMENTS

CN 206265268 U * 6/2017 ............... B63B 7/00
CN 112874695 A * 6/2021 ............. B63B 22/24
(Continued)

*Primary Examiner* — Justin M Benedik
(74) *Attorney, Agent, or Firm* — Rondaus PLLC; George Liu

(57) ABSTRACT

The present disclosure relates to a water surface floating type electromagnetic wave signal relay device, includes: a central processing mechanism, including a first waterproof housing, and a control circuit board and a power supply assembly arranged inside the first waterproof housing, the power supply assembly being connected to the control circuit board; an antenna mechanism, including a second waterproof housing and an antenna assembly arranged inside the second waterproof housing, the second waterproof housing being hermetically assembled and connected to the first waterproof housing, and the antenna assembly being in signal connection with the control circuit board; and a floating mechanism, including three or more floating units, the three or more floating units being distributed around the central processing mechanism in an annular array, and each of the floating units being connected to the first waterproof housing of the central processing mechanism in a stretchable and/or foldable manner.

20 Claims, 13 Drawing Sheets

(58) Field of Classification Search
CPC ....... B63B 7/00; B63B 7/08; B63B 2007/003; H04B 13/02
See application file for complete search history.

(56) References Cited

U.S. PATENT DOCUMENTS

| | | | | |
|---|---|---|---|---|
| 7,005,573 | B2 * | 2/2006 | Lionetta | H05K 9/0032 174/387 |
| 8,045,919 | B2 * | 10/2011 | Rhodes | H04B 13/02 367/901 |
| 2003/0227760 | A1 * | 12/2003 | Albayrak | H05K 9/0026 361/800 |
| 2017/0075014 | A1 * | 3/2017 | Westerdahl | G01V 1/3852 |

FOREIGN PATENT DOCUMENTS

| | | | | |
|---|---|---|---|---|
| CN | 218997078 U | * | 5/2023 | |
| CN | 116846412 A | * | 10/2023 | B63B 35/00 |

* cited by examiner

WATER SURFACE FLOATING TYPE ELECTROMAGNETIC WAVE SIGNAL RELAY DEVICE

TECHNICAL FIELD

The present disclosure belongs to the technical field of signal interaction, and more particularly relates to a water surface floating type electromagnetic wave signal relay device.

BACKGROUND

Currently, in information collection activities such as underwater photography, relay devices are usually used to transmit information collected underwater to equipment on land or in the sky. However, the existing relay devices are divided into two categories. One is the relay device placed on a ship and operated by an operator on the ship. Although this type of device does not have strict requirements for waterproofing, it is extremely inconvenient to operate; and it has extremely high requirements for the coordination between the operator on the ship and an underwater device or underwater operator, and there are significant safety hazards. The other type is the relay device floating on the water, but this type of device is large in size and usually remains on the water surface for a long time after being anchored to a submarine device by cables, with poor portability and maneuverability, and obvious lack of immediate operability.

SUMMARY

In order to solve the above problems existing in the prior art, the present disclosure provides a water surface floating type electromagnetic wave signal relay device.

In order to solve the above technical problems, the present disclosure adopts the following technical solutions:

A water surface floating type electromagnetic wave signal relay device according to the present disclosure includes:

- a central processing mechanism, including a first waterproof housing, a control circuit board and a power supply assembly, the control circuit board and the power supply assembly being arranged inside the first waterproof housing, and the power supply assembly being connected to the control circuit board;
- an antenna mechanism, including a second waterproof housing and an antenna assembly, the antenna assembly being arranged inside the second waterproof housing, the second waterproof housing being hermetically assembled and connected to the first waterproof housing, and the antenna assembly being in signal connection with the control circuit board; and
- a floating mechanism, including three or more floating units, all the floating units being distributed along the periphery of the central processing mechanism in an annular array, and the floating units being connected to the first waterproof housing of the central processing mechanism in a stretchable and/or foldable manner.

Further, the water surface floating type electromagnetic wave signal relay device further includes an underwater signal cable mechanism, and the underwater signal cable mechanism is detachably and adjustably connected to the central processing mechanism.

Further, the first waterproof housing is also provided with a shielding case, the control circuit board is installed inside the shielding case, the shielding case is made of metal, and the shielding case is internally provided with a plurality of anti-interference shielding walls arranged at intervals for conducting electromagnetic wave isolation on different frequency band signal processing circuits of the control circuit board.

Further, the first waterproof housing has a polyhedral cone structure.

Further, a mounting interface is provided in an upper end of the first waterproof housing, and a lower end of the antenna mechanism is detachably assembled on the mounting interface.

Further, a rotary clamping slot is provided at the mounting interface, a mounting joint is arranged at a lower end of the second waterproof housing of the antenna mechanism, and a clamping block is arranged on a peripheral surface of the mounting joint; and during assembly, the mounting joint is fitted into the mounting interface in a matching manner, and the clamping block is clamped into the rotary clamping slot and screwed to a locking position of the rotary clamping slot.

Further, the second waterproof housing of the antenna mechanism is columnar, and the antenna assembly inside the second waterproof housing is in a columnar shape adapted to the columnar second waterproof housing.

Further, the columnar second waterproof housing includes a waterproof cover and a base, the antenna assembly is installed in the waterproof cover, the base is assembled together with a lower end of the waterproof cover in a matching manner, and a peripheral surface of the base is provided with two or more positioning reinforcement portions; the positioning reinforcement portions are distributed on the peripheral surface of the base in an annular array, and the positioning reinforcement portions are abutted against a surface of the waterproof cover; and the mounting joint and the clamping block are arranged at a bottom of the base.

Further, each of the floating units includes a connecting rod and a floating body, where the connecting rod includes a first connecting rod and a second connecting rod, one end of the first connecting rod is assembled on the first waterproof housing of the central processing mechanism, one end of the first connecting rod is axially movable, the other end of the connecting rod is rotatably connected to the second connecting rod, and the floating body is mounted on the second connecting rod.

Further, each of the second connecting rods is composed of a long rod and a short rod which are integrally connected, the second connecting rod is L-shaped, an end portion of the short rod is rotatably connected to the first connecting rod, and the floating body is mounted on a rod body of the long rod.

Further, a rotation limit portion is provided on at least one of connecting ends between the first connecting rods and the second connecting rods; and the rotation limit portion is configured to limit the rotation range of the second connecting rod, so as to enable the second connecting rod of each floating unit to freely swing up and down correspondingly with the undulation of sea waves.

Further, connecting rod mounting structures are provided on a peripheral surface of the first waterproof housing of the central processing mechanism; each of the connecting rod mounting structures includes a plug-in seat and a locking buckle, where the plug-in seat is provided with a horizontal plug-in hole, and one end of the first connecting rod is movably assembled in the horizontal plug-in hole; the locking buckle is mounted on the plug-in seat in a seesawing manner, a spring is arranged at one end of the locking buckle, and two ends of the spring are respectively connected to the locking buckle and the plug-in seat; the other end of the locking buckle extends to the front of the horizontal plug-in hole; each of the first connecting rods is at least provided with a first locking position and a second locking position; and when the first connecting rod moves to be in a storage state and a use state, the other end of the locking buckle is separately stuck in the first locking position and the second locking position.

Further, the floating bodies are inflatable airbags, an upper sealing plate and an upper support plate are arranged at an upper end of each of the inflatable airbags, the upper sealing plate and the upper support plate are airtightly connected to each other, and the upper sealing plate and the upper support plate are airtightly connected to an outer surface and an inner surface of the upper end of the inflatable airbag, respectively; a lower sealing plate and a lower support plate are arranged at a lower end of each of the inflatable airbags, the lower sealing plate and the lower support plate are airtightly connected to each other, and the lower sealing plate and the lower support plate are airtightly connected to an outer surface and an inner surface of the lower end of the inflatable airbag, respectively; and the upper sealing plate is connected to the second connecting rod.

Further, the inflatable airbags are accordion type airbags, and the thicknesses of the folded parts of the inflatable airbags are smaller than those of the non-folded parts.

Further, the underwater signal cable mechanism includes a cable and a cable adjustment member, where the cable adjustment member includes a telescopic connecting piece and a cable adjustment sleeve, one end of the telescopic connecting piece is connected to the first waterproof housing of the central processing mechanism, and the other end of the telescopic connecting piece is connected to the cable adjustment sleeve; and the cable is in a coiled state, one end of the cable is connected to the control circuit board in the first waterproof housing, and the other end of the cable is flexibly threaded through the cable adjustment sleeve.

Beneficial effects of the present disclosure:

Through the above technical solutions, the water surface floating type electromagnetic wave signal relay device according to the present disclosure can open the floating mechanism for use and fold it for storage, which greatly improves portability, maneuverability, and operational convenience and safety, and achieves high mobility and one-man operation (without the need for water surface assistance personnel), thus greatly promoting the development of underwater live broadcast, underwater scientific research/science popularization, underwater rescue, diving training, underwater sports and other industries, with strong economic and social benefits.

DETAILED DESCRIPTION OF THE EMBODIMENTS

Figure 1:
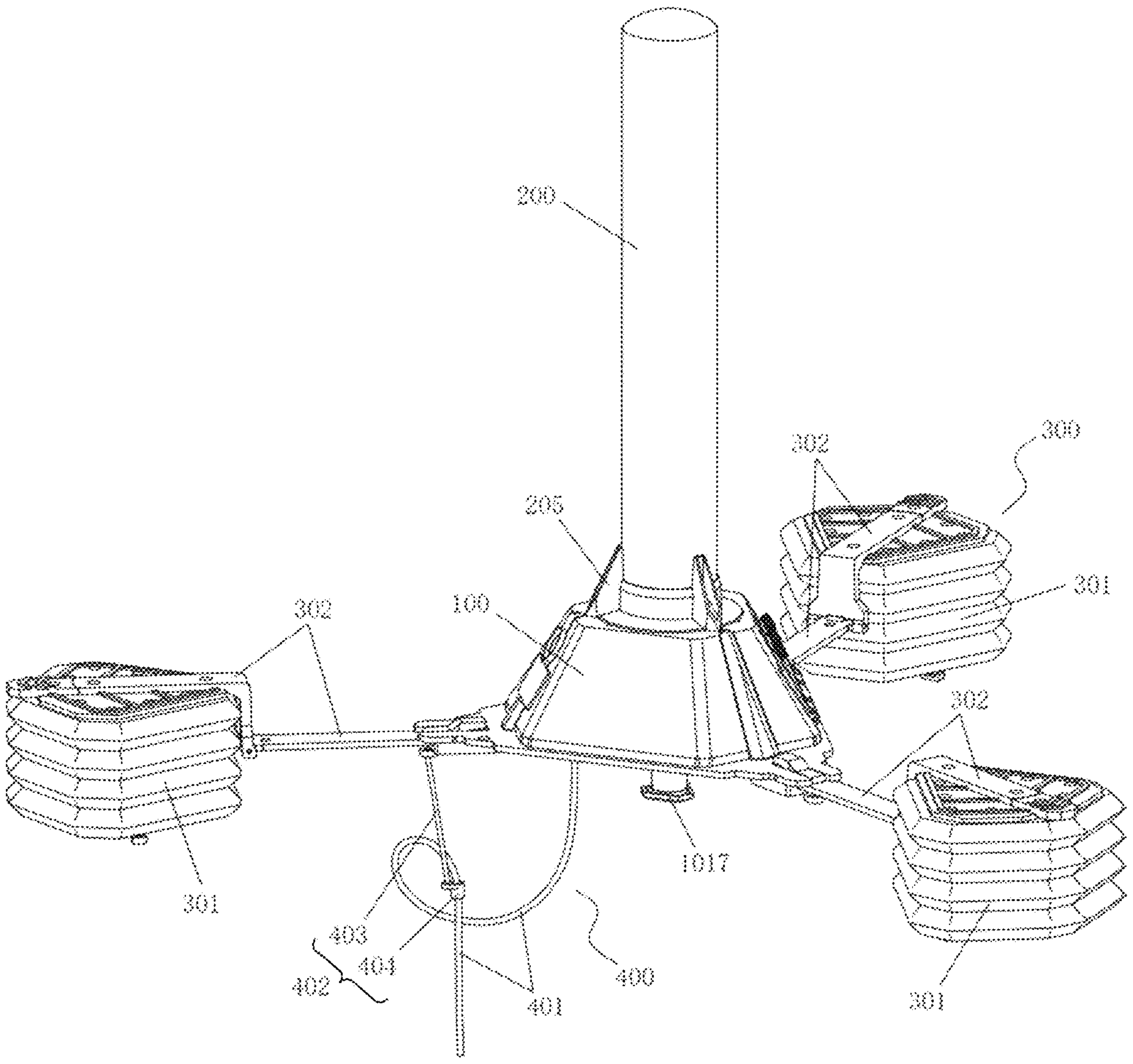
FIG. 1 is a schematic diagram of the structure of a water surface floating type electromagnetic wave signal relay device according to an embodiment of the present disclosure.

In order to make the objectives, technical solutions, and advantages of the present disclosure clearer, the present disclosure will be further described in detail below in conjunction with the accompanying drawings and embodiments. It should be understood that specific embodiments described herein are only used to illustrate the present disclosure and not intended to limit the present disclosure.

Referring to FIG. 1 to FIG. 16, a water surface floating type electromagnetic wave signal relay device according to the present disclosure includes a central processing mechanism 100, an antenna mechanism 200, and a floating mechanism 300.

The central processing mechanism 100 includes a first waterproof housing 101, a control circuit board 102 and a power supply assembly 103, where the control circuit board 102 and the power supply assembly 103 are arranged inside the first waterproof housing 101, and the power supply assembly 103 is connected to the control circuit board 102.

Specifically, the first waterproof housing 101 has a polyhedral cone structure, which is effectively resistant to the impact of water waves and wind. Moreover, the first waterproof housing 101 is a sealed cavity with strong waterproof performance, and thus can effectively protect its internal control circuit board 102, power supply assembly 103 and other components.

More specifically, the first waterproof housing 101 includes a housing 1011 and a bottom plate 1012, where the housing 1011 is a polyhedral cone, a groove 1013 is formed in an upper surface of the bottom plate 1012, the groove 1013 matches the shape and size of a lower end of the housing 1011, and the lower end of the housing 1011 is fitted in the groove 1013 to form the sealed cavity.

Figure 2:
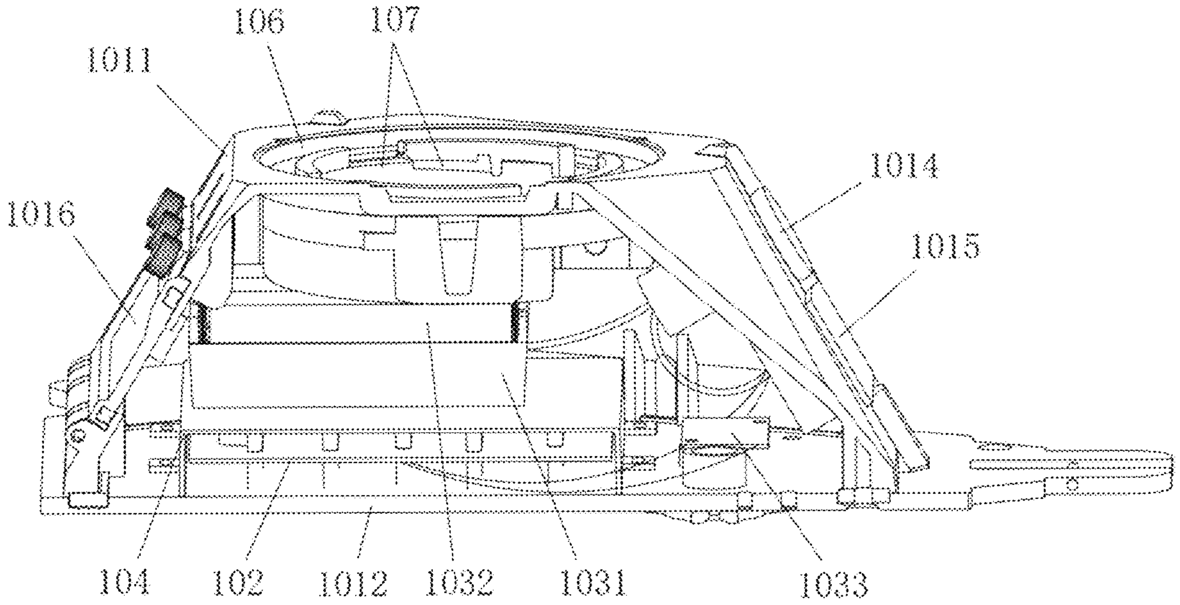
FIG. 2 is a schematic diagram of the partial cross-sectional structure of a central processing mechanism of a water surface floating type electromagnetic wave signal relay device according to an embodiment of the present disclosure.
Figure 3:
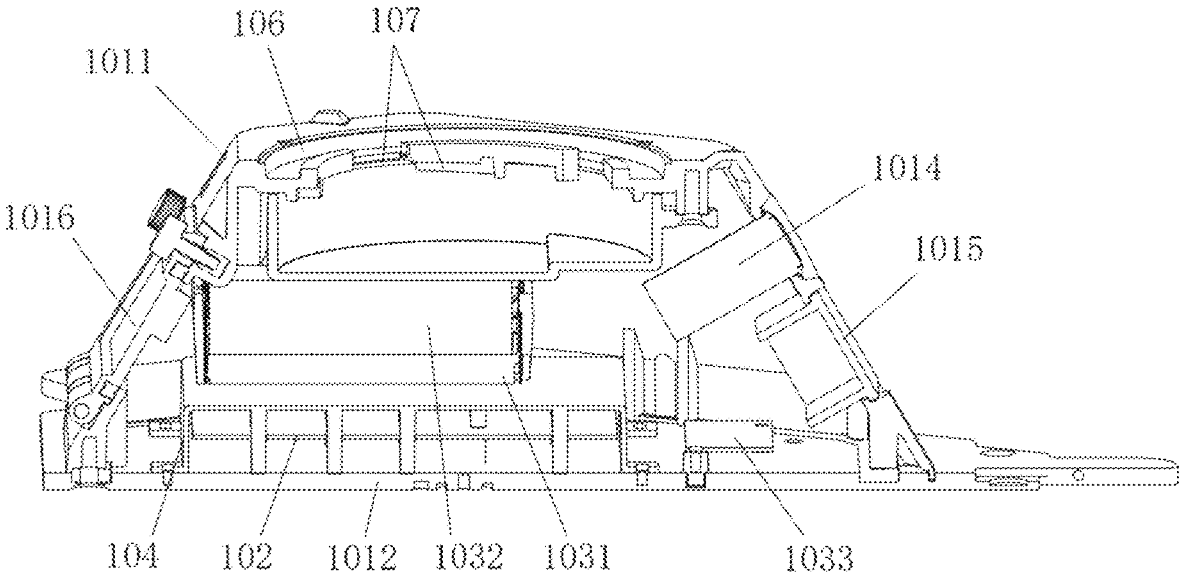
FIG. 3 is a schematic diagram of another partial cross-sectional structure of the central processing mechanism of the water surface floating type electromagnetic wave signal relay device according to the embodiment of the present disclosure.
Figure 4:
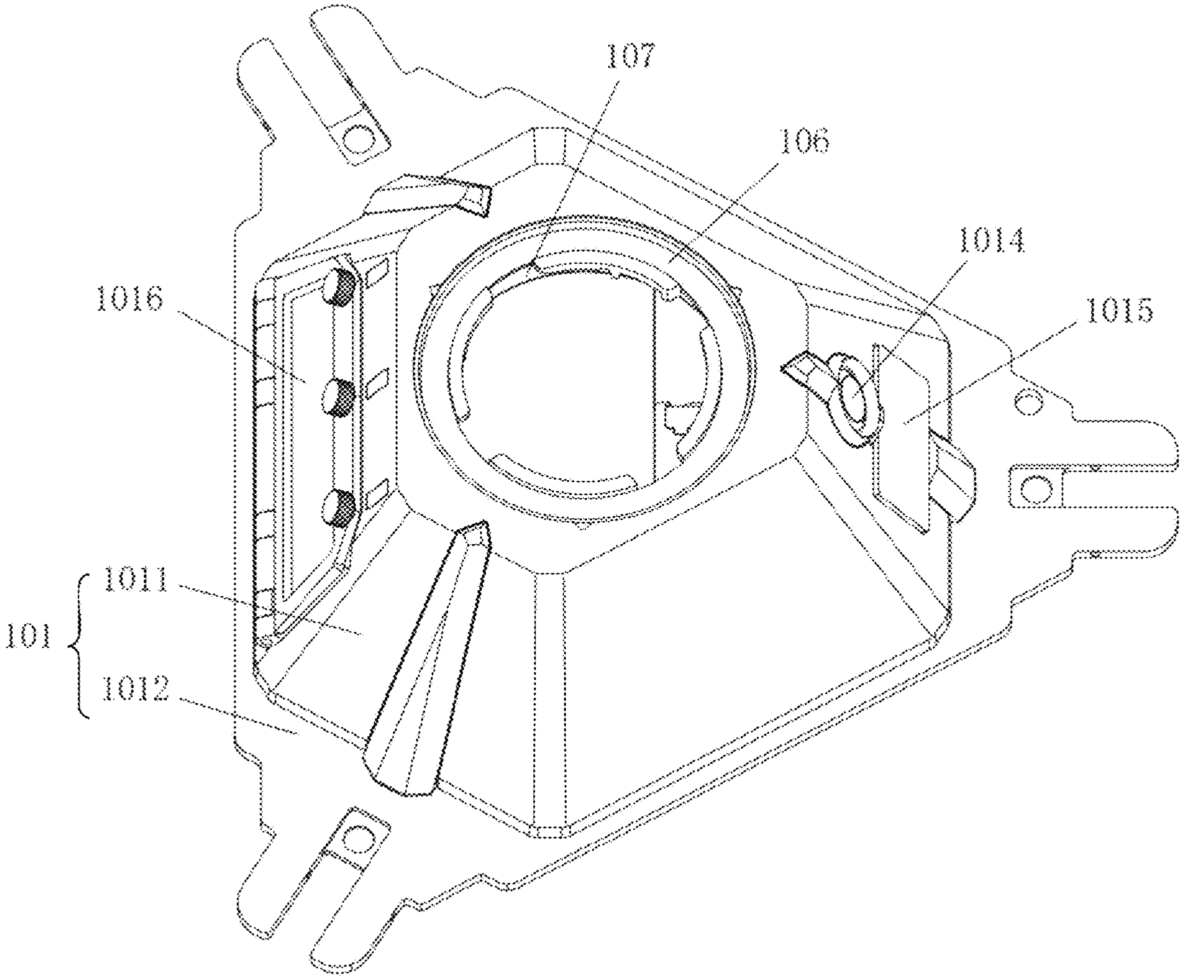
FIG. 4 is a schematic diagram of the top view structure of the central processing mechanism of the water surface floating type electromagnetic wave signal relay device according to the embodiment of the present disclosure.
Figure 5:
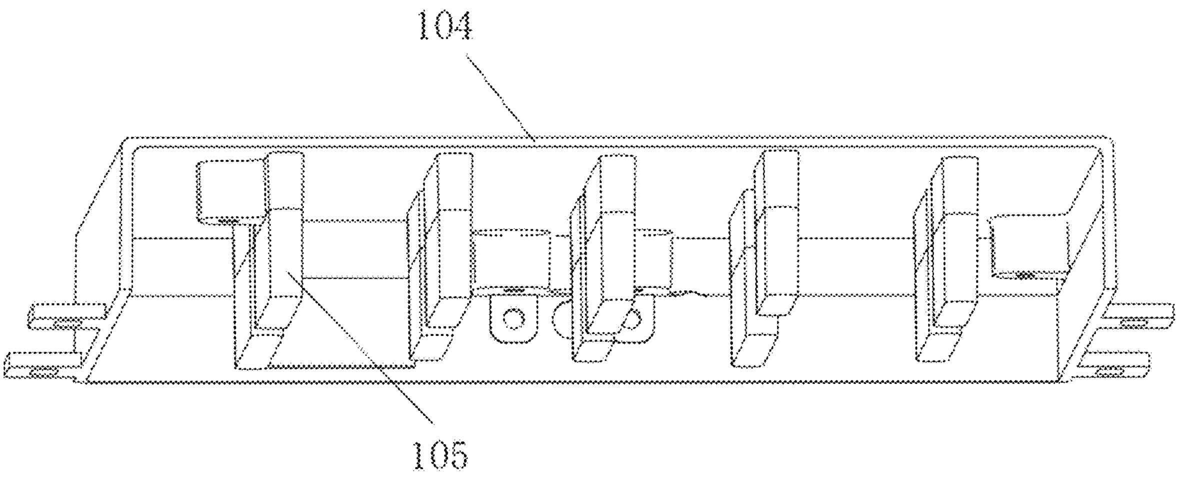
FIG. 5 is a schematic diagram of the cross-sectional structure of a shielding case of a water surface floating type electromagnetic wave signal relay device according to an embodiment of the present disclosure.
Figure 6:
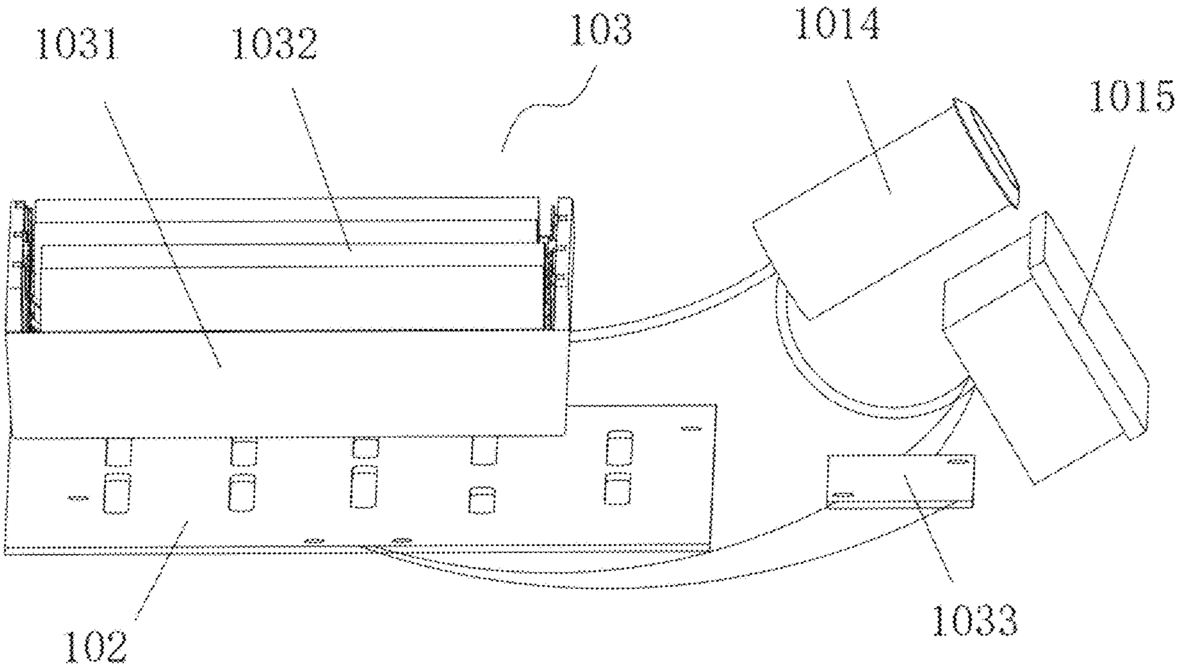
FIG. 6 is a schematic diagram of the structure of a power supply assembly and a control circuit board of a water surface floating type electromagnetic wave signal relay device according to an embodiment of the present disclosure.
Figure 7:
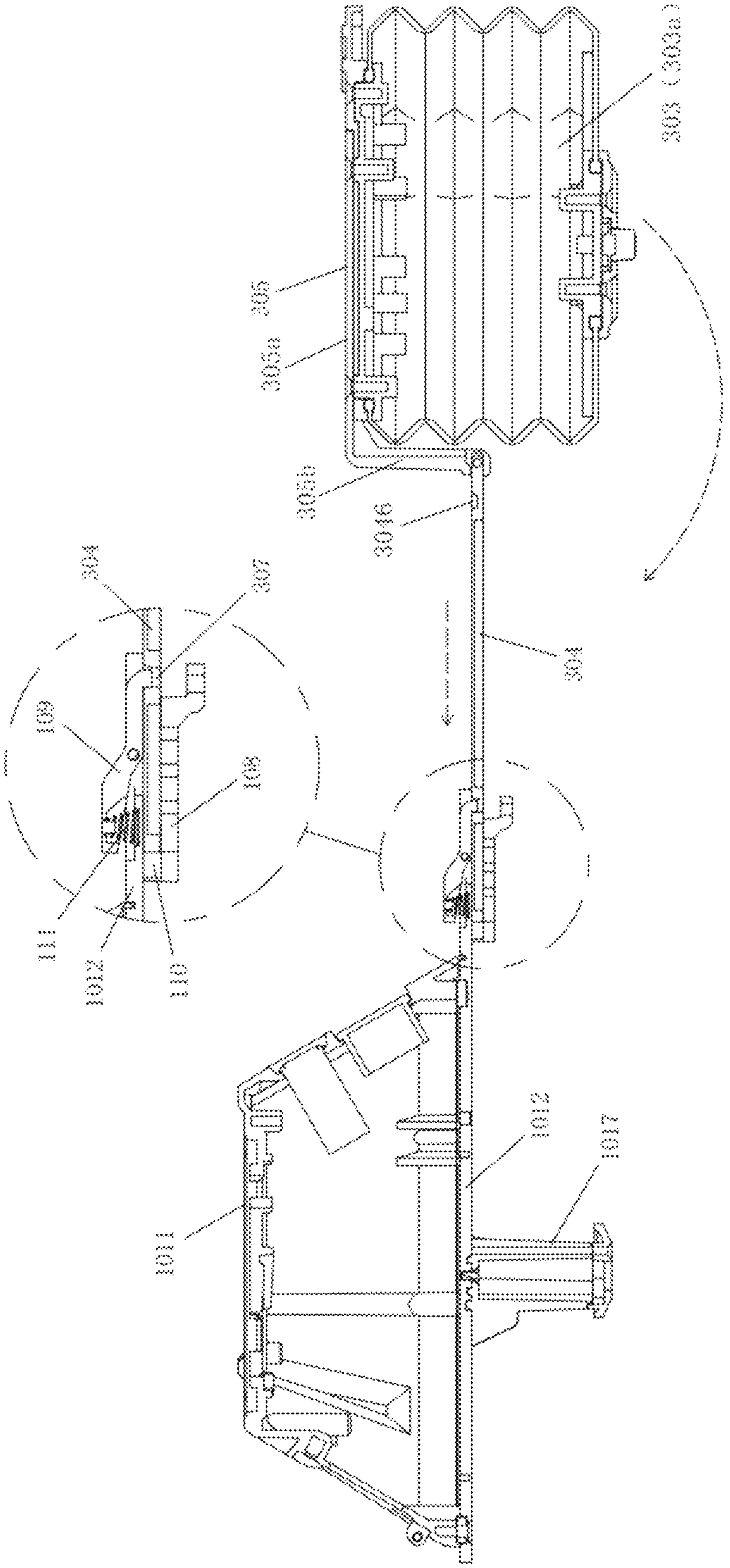
FIG. 7 is a schematic diagram of the structure of a central processing mechanism and a floating unit of a water surface floating type electromagnetic wave signal relay device according to an embodiment of the present disclosure.
Figure 8:
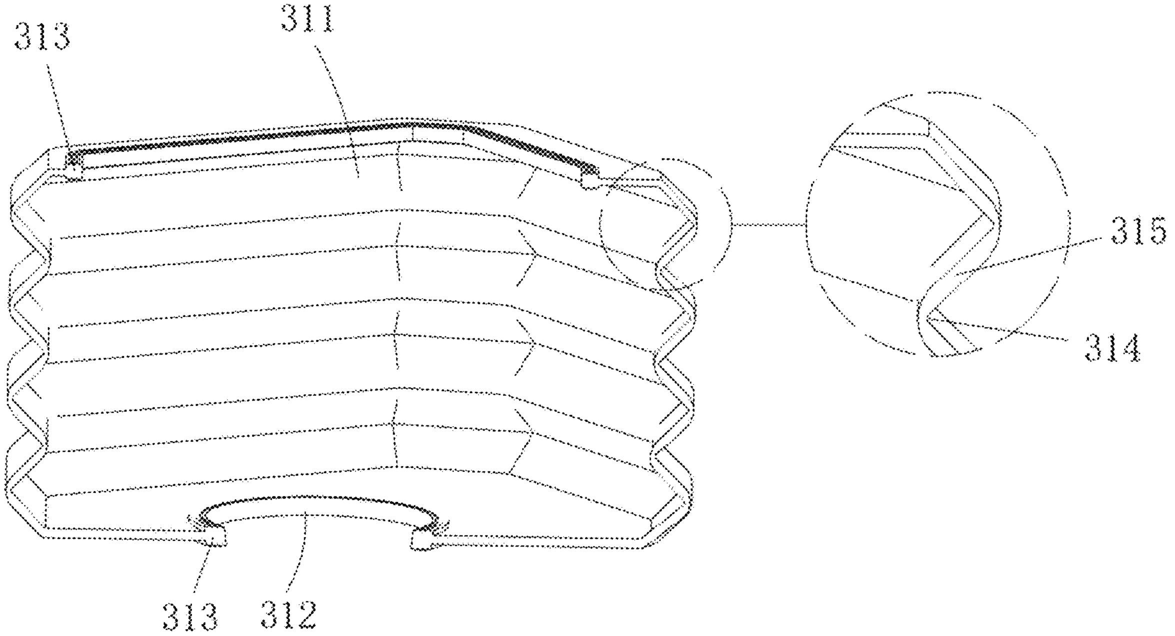
FIG. 8 is a schematic diagram of the cross-sectional structure of an inflatable airbag of a water surface floating type electromagnetic wave signal relay device according to an embodiment of the present disclosure after removing upper and lower sealing plates and support plates.
Figure 9:
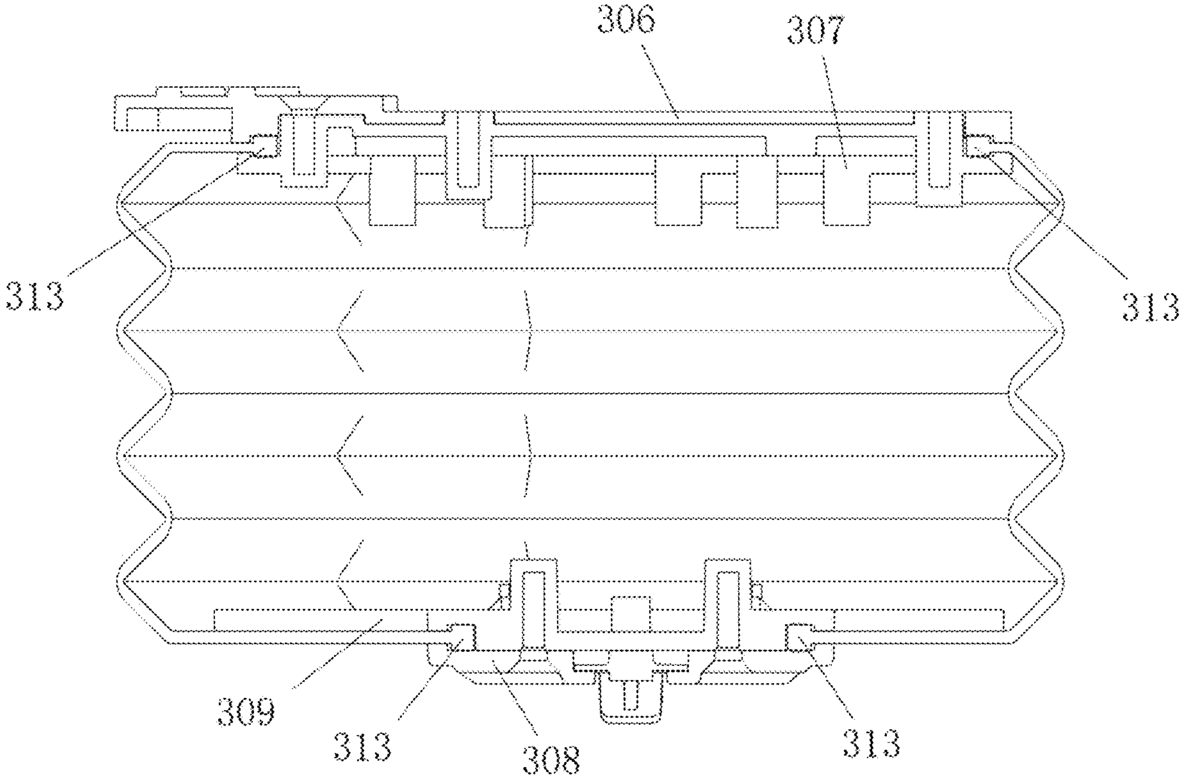
FIG. 9 is a schematic diagram of the cross-sectional structure of the inflatable airbag of the water surface floating type electromagnetic wave signal relay device according to the embodiment of the present disclosure.

The main control circuit board 102 is integrated with a central processing unit and its peripheral circuits. The power supply assembly 103 may specifically include a battery box 1031, a lithium battery 1032, and a voltage stabilizer 1033, where the battery box 1031, the lithium battery 1032, and the voltage stabilizer 1033 are in signal connection with a waterproof switch 1014, a waterproof power display 1015, and the main control circuit board 102, and the main control circuit board 102 is supplied with controllable power through the waterproof switch 1014, as shown in FIG. 2, FIG. 3, and FIG. 6. The waterproof switch 1014 and the waterproof power display 1015 are embedded in the surface of the first waterproof housing 101 (housing 1011), as shown in FIG. 2 to FIG. 4.

In addition, the surface of the first waterproof housing 101 (housing 1011) is provided with a battery cover 1016, the battery cover 1016 is connected to the housing 1011 by means of a rotating shaft, and a sealing ring is mounted on the battery cover 1014 to achieve sealing for waterproofing after the battery cover 1016 is closed. Similarly, the waterproof switch 1014, the waterproof power display 1015, the bottom plate 1012 and the housing 1011 are all sealed for waterproofing by using sealing rings or bonding methods, as shown in FIG. 2 to FIG. 4.

As shown in FIG. 2, FIG. 3, FIG. 5, and FIG. 15, the first waterproof housing 101 is also provided with a shielding case 104, the control circuit board 102 is installed inside the shielding case 104, the shielding case 104 is made of metal, and the shielding case 104 is internally provided with a plurality of anti-interference shielding walls 105 arranged at intervals for conducting electromagnetic wave isolation on different frequency band signal processing circuits of the control circuit board 102.

In an implementable solution, the bottom plate 1012 of the first waterproof housing 101 is made of metal and is connected to the shielding case 104 to form a cavity, so as to isolate the external electromagnetic interference to the main control circuit board 102 located in the cavity. Furthermore, the bottom plate 1012 and the shielding case 104 form a heat dissipation structure to dissipate the heat generated by the main control circuit board 102 to the outside of the device. The combination of this structure with the housing 1011 takes into account multiple requirements such as waterproof sealing, anti-electromagnetic interference, and heat dissipation; and since the bottom plate 1012 is the supporting bottom plate of the entire device and is part of the waterproof structure, and the area of the bottom plate 1012 is much larger than that of the main control circuit board 102, the heat dissipation effect is significantly enhanced. The above structure are the key to realize the miniaturization, low cost and low weight of the device.

Figure 15:
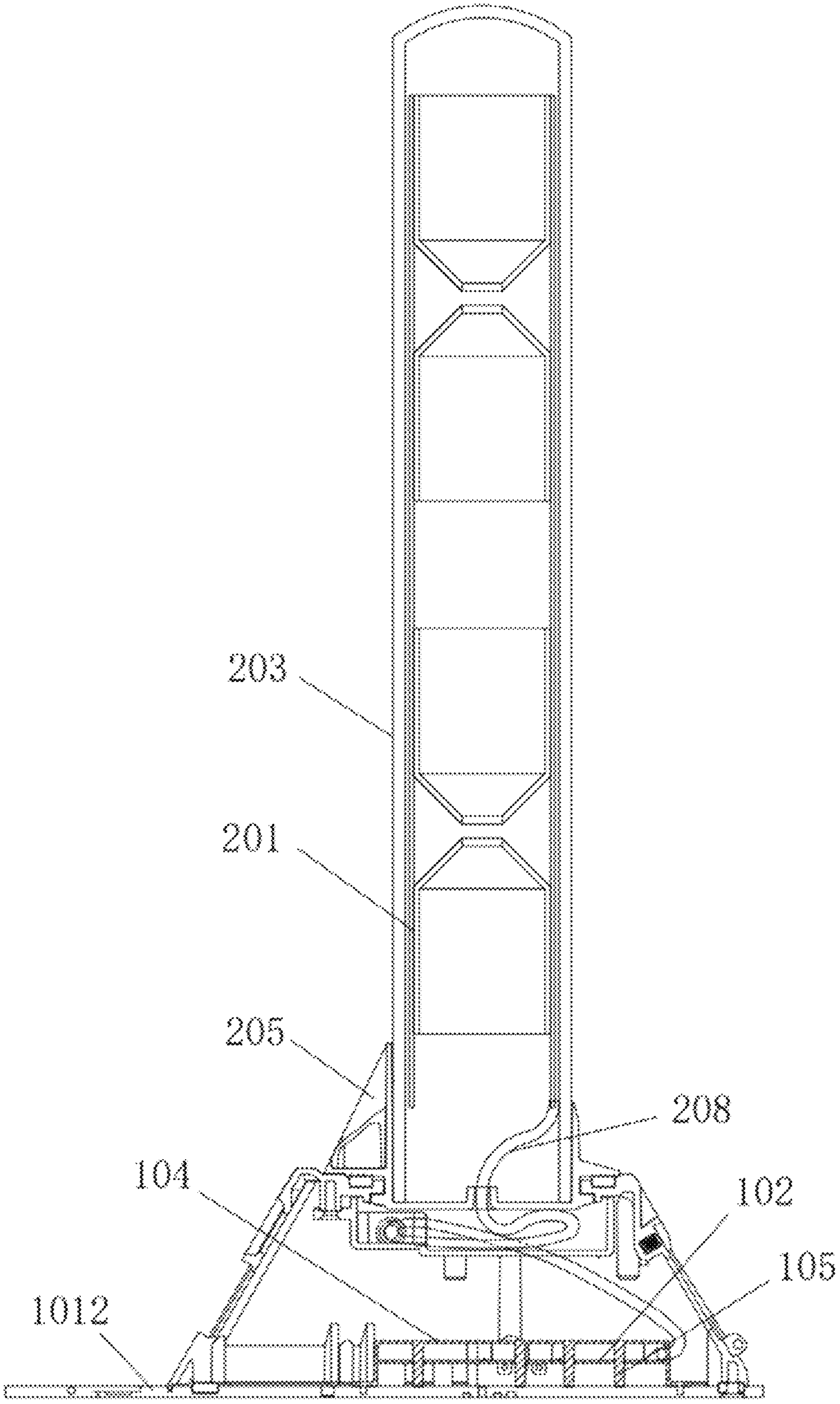
FIG. 15 is a schematic diagram of the cross-sectional structure of the antenna mechanism and the central processing mechanism in an assembly state of the water surface floating type electromagnetic wave signal relay device according to the embodiment of the present disclosure.

As shown in FIG. 15, the antenna mechanism 200 includes a second waterproof housing 201 and an antenna assembly 202, where the second waterproof housing 201 is hermetically assembled and connected to the first waterproof housing 101, and the antenna assembly 202 is arranged inside the second waterproof housing 201 and is in signal connection with the control circuit board 102.

Figure 14:
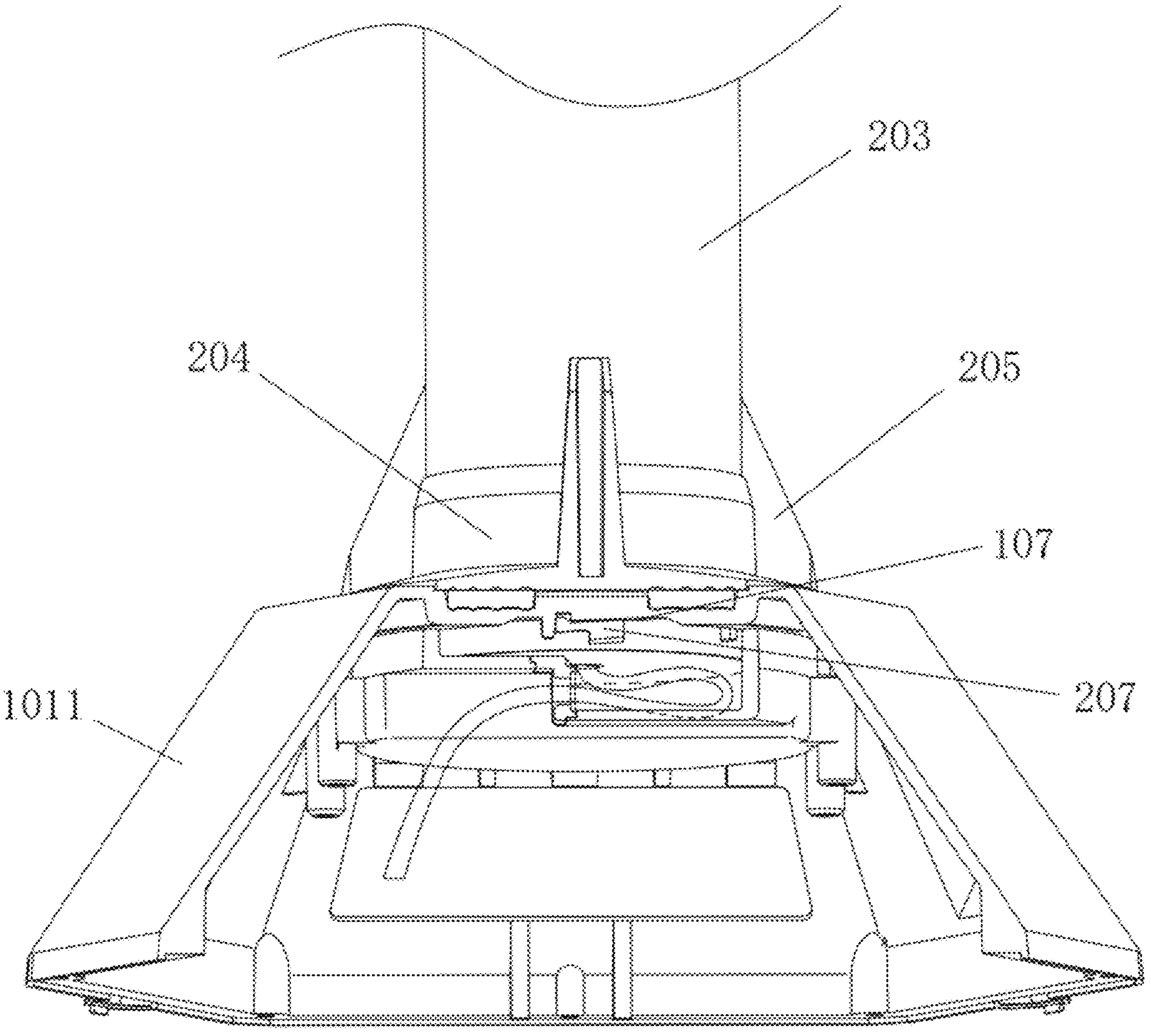
FIG. 14 is a schematic diagram of the partial cross-sectional structure of the antenna mechanism and the central processing mechanism in an assembly state of the water surface floating type electromagnetic wave signal relay device according to the embodiment of the present disclosure.

In an implementable solution, as shown in FIG. 1 and FIG. 14, the second waterproof housing 201 of the antenna mechanism 200 is columnar (e.g. cylindrical), and the antenna assembly 202 inside the second waterproof housing 201 is in a columnar shape adapted to the columnar second waterproof housing 201. The specific structure may be as follows: the columnar second waterproof housing 201 includes a waterproof cover 203 and a base 204, where the waterproof cover 203 is a columnar shape with a closed upper end and an open lower end, and the antenna assembly 202 is installed in the waterproof cover 203, and is connected to the control circuit board 102 by means of a cable 208; the base 204 is assembled together with the lower end of the waterproof cover 203 in a matching manner, and a peripheral surface of the base 204 is provided with two or more positioning reinforcement portions 205; the positioning reinforcement portions 205 are distributed on the peripheral surface of the base 204 in an annular array; and there are preferably 3-6 positioning reinforcing portions 205. When the base 204 is assembled to the lower end of the waterproof cover 203, the positioning reinforcement portions 205 are abutted against a surface of the waterproof cover 203 to play a guiding and limiting role, which not only facilitates the assembly operation, but also further enhances the assembly stability.

As a preferred solution of the present disclosure, as shown in FIG. 2, FIG. 3, FIG. 4, FIG. 13, FIG. 14, and FIG. 15, a mounting interface 106 is provided in an upper end of the first waterproof housing (housing 1011), and a lower end of the antenna mechanism 200 is detachably assembled on the mounting interface 106. The lower end of the antenna mechanism 200 and the mounting interface 106 are provided with a plurality of mutually matching inclined surfaces, which are rotated during assembly; and a sealing ring is arranged between the lower end of the antenna mechanism 200 and the mounting interface 106. Under the interaction of the respective inclined surfaces, a gap between the lower end of the antenna mechanism 200 and the mounting interface 106 becomes smaller; and when the gap is minimum, the sealing ring is pressed to achieve sealing for waterproofing. The specific structure may be as follows: a rotary clamping slot 107 is provided at the mounting interface 106, a mounting joint 206 is arranged at a lower end of the second waterproof housing 201 of the antenna mechanism 200, and a clamping block 207 is arranged on a peripheral surface of the mounting joint 206, that is, the bottom of the base 204 is provided with the mounting joint 206 and the clamping block 207. During assembly for use, the mounting joint 206 is fitted into the mounting interface 106 in a matching manner, and the clamping block 207 is clamped into the rotary clamping slot 107 and screwed to a locking position of the rotary clamping slot 107. Conversely, the antenna mechanism 200 can be disassembled and stored, making it more convenient to carry and transport.

The mounting interface 106 is internally provided with a storage space for the cable 208 of the antenna mechanism 200; when the antenna mechanism 200 is assembled with the central processing mechanism 100, the cable 208 can be coiled and rotated in the storage space; and when the antenna mechanism 200 is removed, the cable 208 in the storage space can be pulled out, so that the antenna mechanism 200 can be stored.

As shown in FIG. 1, FIG. 7, FIG. 11, FIG. 12, and FIG. 16, floating mechanism 300 includes three or more floating units 301, and the three or more floating units 301 are distributed along the periphery of the central processing mechanism 100 in an annular array; and the floating units 301 are connected to the first waterproof housing 101 of the central processing mechanism 100 in a stretchable and/or foldable manner. The specific structure may be as follows: each of the floating units 301 includes a connecting rod 302 and a floating body 303, where the connecting rod 302 includes a first connecting rod 304 and a second connecting rod 305, one end of the first connecting rod 304 is assembled on the first waterproof housing 101 of the central processing mechanism 100, one end of the first connecting rod 304 is axially movable, the other end of the connecting rod 302 is rotatably connected to the second connecting rod 305, and the floating body 303 is mounted on the second connecting rod 305. When in use, the first connecting rod 304 is pulled out, and then the second connecting rod 305 is opened by upturning, so as to complete the opening of the floating unit 301; and on the contrary, the second connecting rod is turned down and folded, and the first connecting rod 304 is retracted inward, so as to complete the folding of the floating unit 301. At this time, the floating unit 301 is located at the bottom of the central processing mechanism 100 (bottom plate 1012) and is hooked and locked by a limit hook 1017 arranged on the bottom plate 1012, so that the operation is simple and convenient, and the easy storage and portability of the device are further improved.

More specifically, connecting rod mounting structures 101*a* are provided on a peripheral surface of the first waterproof housing 101 of the central processing mechanism 100 (i.e., the bottom plate 1012); each of the connecting rod mounting structures 101*a* includes a plug-in seat 108 and a locking buckle 109, where the plug-in seat 108 is provided with a horizontal plug-in hole 110, and one end of the first connecting rod 304 is movably assembled in the horizontal plug-in hole 110; the locking buckle 109 is mounted on the plug-in seat 108 in a seesawing manner, a spring 111 is arranged at one end of the locking buckle 109, and two ends of the spring 111 are respectively connected to the locking buckle 109 and the plug-in seat 108; the other end of the locking buckle 109 extends to the front of the horizontal plug-in hole 110; and each of the first connecting rods 304 is provided with a first locking position 3046 and a second locking position 3047. When the first connecting rod 304 is pushed inward and retracted to a storage state (fully retracted state), the other end of the locking buckle 109 is stuck in the first locking position 3046. When the first connecting rod 304 is pulled out to a use state (fully pulled-out state), the other end of the locking buckle 109 is stuck in the second locking position 3047; and during the processes of pushing inward and pulling out, the locking buckle 109 is automatically stuck in the first locking position 3046 or the second locking position 3047 under the action of the spring 111, making the operation simple, convenient, and fast. Of course, the first connecting rods 304 may also be provided with a plurality of second locking positions 307 to control all the floating units 301, thus meeting the usage requirements of different water surface environments.

According to the present disclosure, the first connecting rods 304 and the second connecting rods 305 are connected with each other by rotating shaft structures, at least one of connecting ends between the first connecting rods 304 and the second connecting rods 305 is provided with a rotation limit portion 317, and the rotation limit portion 317 is configured to limit the rotation range of the second connecting rod 305. When the device is in use, the second connecting rod 305 of each floating unit 301 can freely swing up and down correspondingly with the undulation of sea waves, so as to maintain the stability of the device to the maximum extent, thereby improving the reliability and safety of the connection with underwater equipment.

In addition, the floating mechanism 300 of the present application preferably adopts three floating units 301, which are symmetrically distributed in a triangular shape around the central processing mechanism 100. In this way, it not only meets the requirements for the floating support performance of the device, but also achieves the purposes of lightweight and simplification.

As shown in FIG. 1, FIG. 7, FIG. 11, and FIG. 12, each of the second connecting rods 305 is composed of a long rod 305*a* and a short rod 305*b* which are integrally connected, the second connecting rod 305 is L-shaped, an end portion of the short rod 305*b* is rotatably connected to the first connecting rod 304, and the floating body 303 is mounted on a rod body of the long rod 305*a*. By using the L-shaped second connecting rod 305, when the second connecting rod 305 is folded, a space for storing the floating body 303 is formed between the second connecting rod 305 and the central processing mechanism 100 (bottom plate 1012), and the whole mechanism is in a compressed and folded state, which greatly reduces the proportion of the space occupied by the floating mechanism 300 after retracting and folding, thus further improving the easy storage and portability of the device.

As a preferred solution of the present disclosure, the floating bodies 303 are inflatable airbags 303*a*, which may be made of silica gel or rubber; an upper sealing plate 306 and an upper support plate 307 are arranged at an upper end of each of the floating bodies 303, the upper sealing plate 306 and the upper support plate 307 are airtightly connected to each other, and the upper sealing plate 306 and the upper support plate 307 are airtightly connected to an outer surface and an inner surface of the upper end of the inflatable airbag 303*a*, respectively; a lower sealing plate 308 and a lower support plate 309 are arranged at a lower end of each of the inflatable airbags 303*a*, the lower sealing plate 308 and the lower support plate 309 are airtightly connected to each other, and the lower sealing plate 308 and the lower support plate 309 are airtightly connected to an outer surface and an inner surface of the lower end of the inflatable airbag 303*a*, respectively; and the upper sealing plate 306 is connected to the second connecting rod 305. The specific structure is as follows: annular protruding edges 313 are formed at edges of upper openings 311 and lower openings 312 of the inflatable airbags 303*a*. After the upper sealing plates 306 are assembled and connected to the upper support plates 307, the annular protruding edges 313 of the upper openings 311 of the inflatable airbags 303*a* are clamped; after the lower sealing plates 308 are assembled and connected to the lower support plates 309, the annular protruding edges 313 of the lower openings 312 of the inflatable airbags are clamped; and therefore, waterproof sealing is achieved, as shown in FIG. 1, FIG. 7, FIG. 8, FIG. 9, FIG. 10, and FIG. 12.

In order to further improve the easy storage and portability of the device, the inflatable airbags 303*a* are accordion type airbags, and the thicknesses of the folded parts of the inflatable airbags 303*a* (accordion type airbags) are smaller than those of the non-folded parts. Specifically, the inflatable airbags 303*a* are in multi-layer foldable/stretchable shapes, a bending groove 314 is formed at each of the folded parts, and the thickness of the bending groove 314 is less than the thickness of a non-bending part 315, as shown in FIG. 1, FIG. 7, FIG. 8, FIG. 9, FIG. 10, and FIG. 12.

Figure 10:
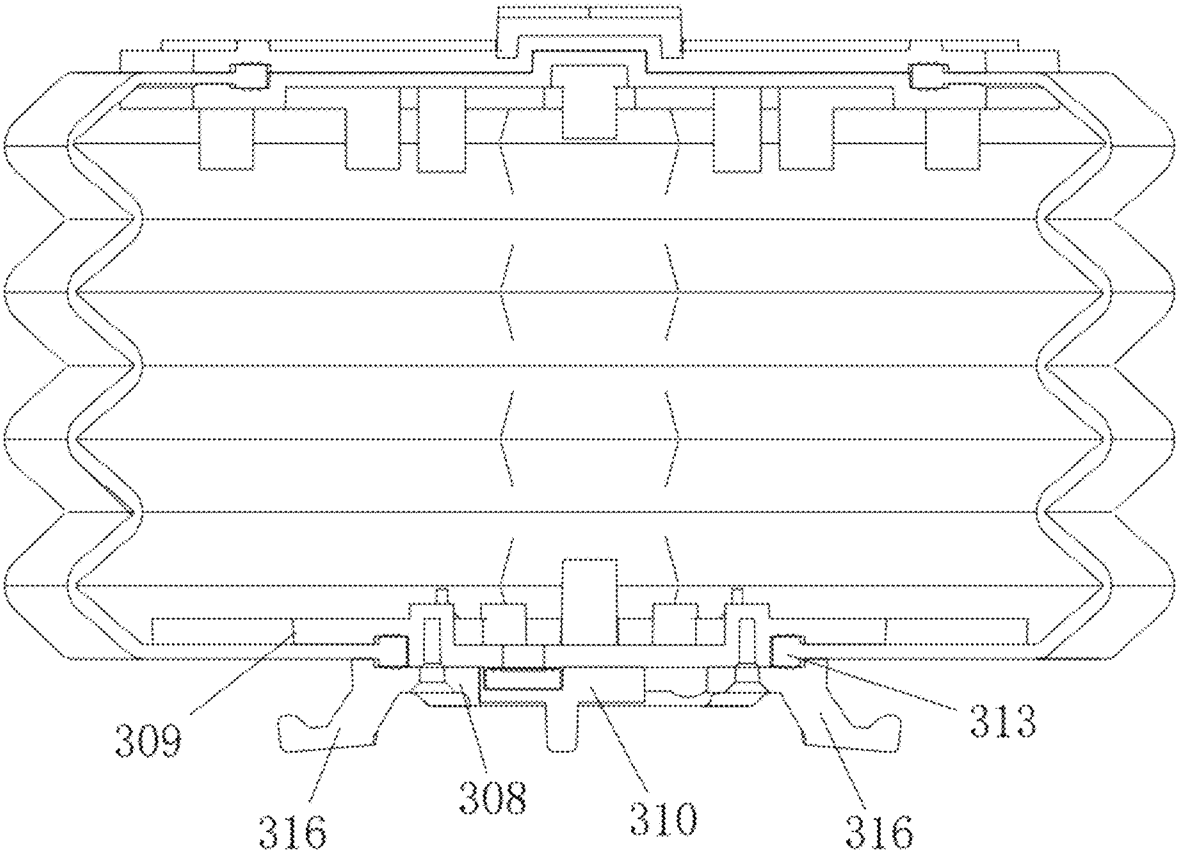
FIG. 10 is a schematic diagram of another cross-sectional structure of the inflatable airbag of the water surface floating type electromagnetic wave signal relay device according to the embodiment of the present disclosure.
Figure 11:
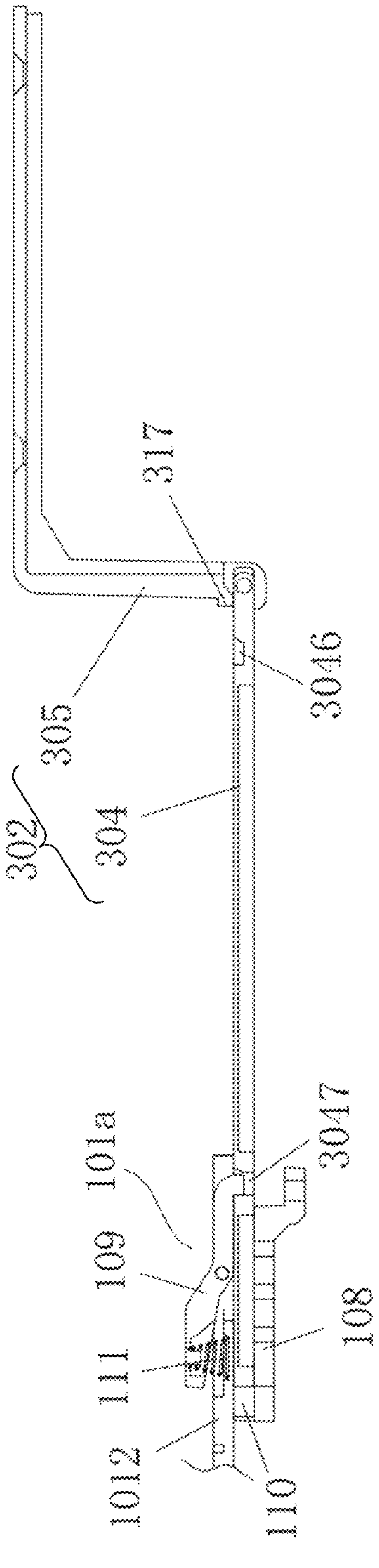
FIG. 11 is a schematic diagram of the structure of a bottom plate and a connecting rod of a water surface floating type electromagnetic wave signal relay device according to an embodiment of the present disclosure.
Figure 12:
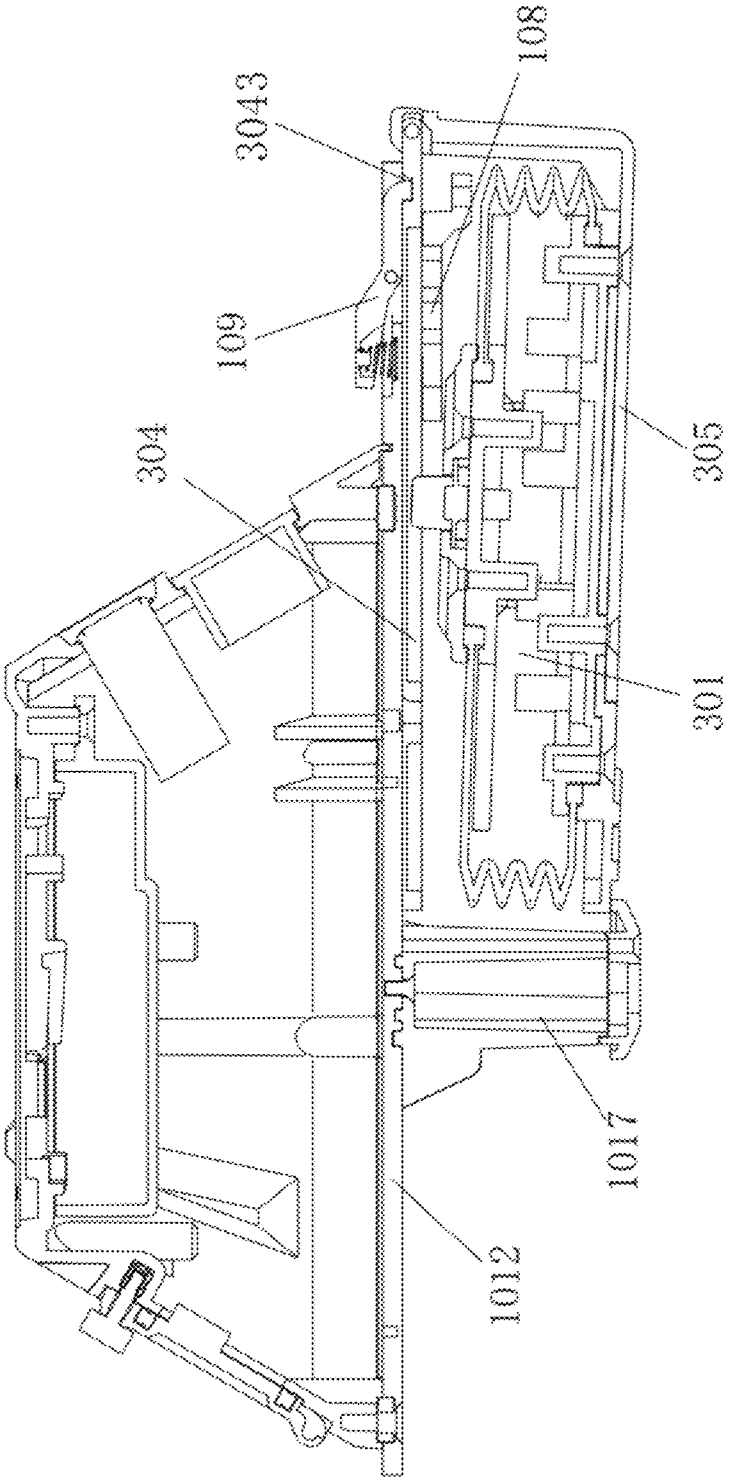
FIG. 12 is a schematic diagram of the structure of a floating unit in a retracted folding state of a water surface floating type electromagnetic wave signal relay device according to an embodiment of the present disclosure.
Figure 13:
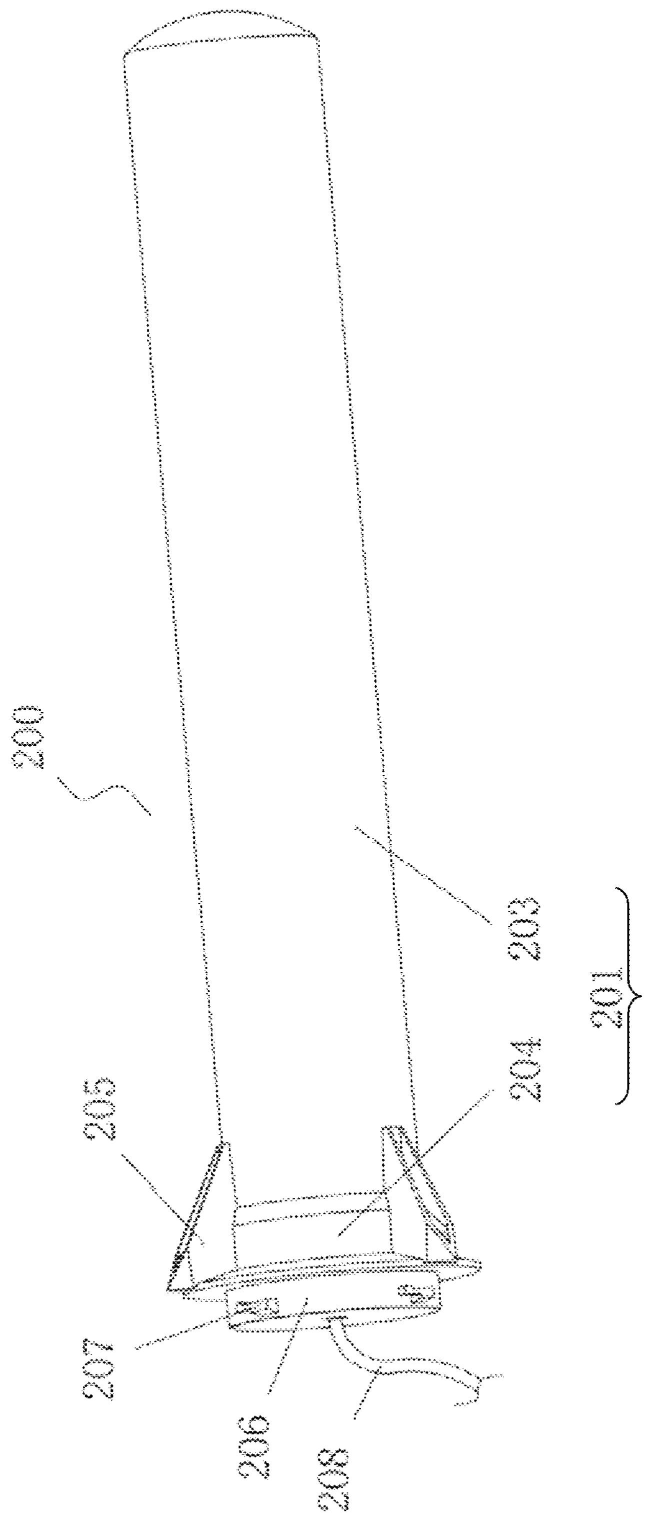
FIG. 13 is a schematic diagram of the structure of an antenna mechanism of a water surface floating type electromagnetic wave signal relay device according to an embodiment of the present disclosure.

In addition, inflation and deflation switches 310 are arranged between the lower sealing plates 308 and the lower support plates 309, an opening is provided in a center of each of the lower support plates 309, an elastic material sealing gasket is embedded in each of the inflation and deflation switches 310, and the inflation and deflation switch 310 can slide within a range limited by the lower sealing plate 308, so that the opening and closing of the central openings of the lower support plates 309 can be realized. Furthermore, two L-shaped protrusions 316 are provided on each of the lower sealing plates 308 for two fingers to hold on the L-shaped protrusions 316, and the lower parts of the lower sealing plate 308, the lower support plate 309 and the inflatable airbag 303*a* connected together are stretched outward to realize the inflation and expansion of the airbag, as shown in FIG. 10. By adopting the structure, one-hand operation of inflation and deflation can be realized, which is very convenient.

Figure 16:
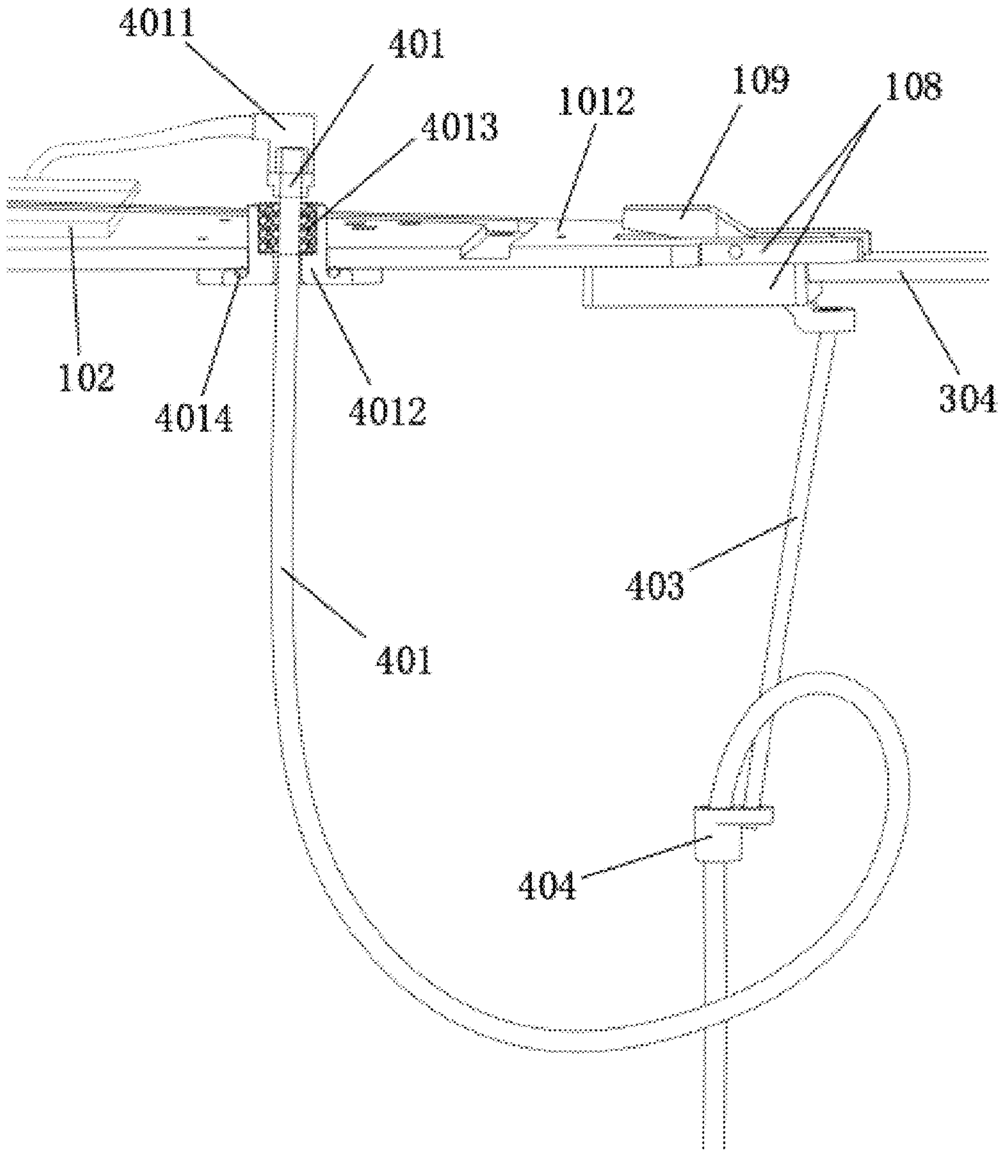
FIG. 16 is a schematic diagram of the partial cross-sectional structure of an underwater signal cable mechanism and a central processing mechanism in an assembly state of a water surface floating type electromagnetic wave signal relay device according to an embodiment of the present disclosure.

As another preferred solution of the present disclosure, as shown in FIG. 1, the water surface floating type electromagnetic wave signal relay device according to the present disclosure also includes an underwater signal cable mechanism 400. In order to offset the pulling force of the water surface surge on underwater signal cables and improve the stability and safety of an underwater device and an operator, the underwater signal cable mechanism 400 is detachably and adjustably connected to the central processing mechanism 100. The specific structure may be as follows: the underwater signal cable mechanism 400 includes a cable 401 and a cable adjustment member 402, where the cable adjustment member 402 includes a telescopic connecting piece 403 and a cable adjustment sleeve 404, one end of the telescopic connecting piece 403 is connected to the first waterproof housing 101 of the central processing mechanism 100, and the other end of the telescopic connecting piece 403 is connected to the cable adjustment sleeve 404; the cable 401 is in a coiled state, one end of the cable 401 is connected to the control circuit board 102 inside the first waterproof housing 101 by using a quick plug structure (as shown in FIG. 16, after one end of the cable 401 passes through the bottom plate 1012, a cable quick connector 4011 is in signal connection with a terminal quick interface 1021 connected to the control circuit board 102, and a waterproof sealing head 4012 is arranged at the position where the cable 401 passes through the bottom plate 1012; waterproof sealant 4013 is used to bond the position where the cable 401 passes through the waterproof sealing head 4012; the waterproof sealing head 4012 is detachably assembled with the bottom plate 1012 by means of screws, and a sealing ring 4014 is arranged between the waterproof sealing head 4012 and the bottom plate 1012), and the other end of the cable 401 is flexibly threaded through the cable adjustment sleeve 404.

The foregoing descriptions are merely exemplary implementations of the present disclosure. It should be pointed out that, for those of ordinary skill in the art, some improvements and embellishments can be made without departing from the principle of the present disclosure, and these improvements and embellishments should also be regarded as the protection scope of the present disclosure.

What is claimed is:

1. A water surface floating type electromagnetic wave signal relay device, comprising:

a central processing mechanism, comprising a first waterproof housing, a control circuit board and a power supply assembly, the control circuit board and the power supply assembly being arranged inside the first waterproof housing, and the power supply assembly being connected to the control circuit board;

an antenna mechanism, comprising a second waterproof housing and an antenna assembly, the antenna assembly being arranged inside the second waterproof housing, the second waterproof housing being hermetically assembled and connected to the first waterproof housing, and the antenna assembly being in signal connection with the control circuit board; and a floating mechanism, comprising three or more floating units, all the floating units being distributed along the periphery of the central processing mechanism in an annular array, and the floating units being connected to the first waterproof housing of the central processing mechanism in a stretchable and/or foldable manner.

2. The water surface floating type electromagnetic wave signal relay device according to claim 1, further comprising an underwater signal cable mechanism, wherein the underwater signal cable mechanism is detachably and adjustably connected to the central processing mechanism.

3. The water surface floating type electromagnetic wave signal relay device according to claim 1, wherein the first waterproof housing is also provided with a shielding case, the control circuit board is installed inside the shielding case, the shielding case is made of metal, and the shielding case is internally provided with a plurality of anti-interference shielding walls arranged at intervals for conducting electromagnetic wave isolation on different frequency band signal processing circuits of the control circuit board.

4. The water surface floating type electromagnetic wave signal relay device according to claim 2, wherein the first waterproof housing is also provided with a shielding case, the control circuit board is installed inside the shielding case, the shielding case is made of metal, and the shielding case is internally provided with a plurality of anti-interference shielding walls arranged at intervals for conducting electromagnetic wave isolation on different frequency band signal processing circuits of the control circuit board.

5. The water surface floating type electromagnetic wave signal relay device according to claim 1, wherein the first waterproof housing has a polyhedral cone structure.

6. The water surface floating type electromagnetic wave signal relay device according to claim 2, wherein the first waterproof housing has a polyhedral cone structure.

7. The water surface floating type electromagnetic wave signal relay device according to claim 1, wherein a mounting interface is provided in an upper end of the first waterproof housing, and a lower end of the antenna mechanism is detachably assembled on the mounting interface.

8. The water surface floating type electromagnetic wave signal relay device according to claim 2, wherein a mounting interface is provided in an upper end of the first waterproof housing, and a lower end of the antenna mechanism is detachably assembled on the mounting interface.

9. The water surface floating type electromagnetic wave signal relay device according to claim 7, wherein a rotary clamping slot is provided at the mounting interface, a mounting joint is arranged at a lower end of the second waterproof housing of the antenna mechanism, and a clamping block is arranged on a peripheral surface of the mounting joint; and during assembly, the mounting joint is fitted into the mounting interface in a matching manner, and the clamping block is clamped into the rotary clamping slot and screwed to a locking position of the rotary clamping slot.

10. The water surface floating type electromagnetic wave signal relay device according to claim 7, wherein the second waterproof housing of the antenna mechanism is columnar, and the antenna assembly inside the second waterproof housing is in a columnar shape adapted to the columnar second waterproof housing.

11. The water surface floating type electromagnetic wave signal relay device according to claim 9, wherein the columnar second waterproof housing comprises a waterproof cover and a base, the antenna assembly is installed in the waterproof cover, the base is assembled together with a lower end of the waterproof cover in a matching manner, and a peripheral surface of the base is provided with two or more positioning reinforcement portions; the positioning reinforcement portions are distributed on the peripheral surface of the base in an annular array, and the positioning reinforcement portions are abutted against a surface of the waterproof cover; and the mounting joint and the clamping block are arranged at a bottom of the base.

12. The water surface floating type electromagnetic wave signal relay device according to claim 1, wherein each of the floating units comprises a connecting rod and a floating body, wherein the connecting rod comprises a first connecting rod and a second connecting rod, one end of the first connecting rod is assembled on the first waterproof housing of the central processing mechanism, one end of the first connecting rod is axially movable, the other end of the connecting rod is rotatably connected to the second connecting rod, and the floating body is mounted on the second connecting rod.

13. The water surface floating type electromagnetic wave signal relay device according to claim 2, wherein each of the floating units comprises a connecting rod and a floating body, wherein the connecting rod comprises a first connecting rod and a second connecting rod, one end of the first connecting rod is assembled on the first waterproof housing of the central processing mechanism, one end of the first connecting rod is axially movable, the other end of the connecting rod is rotatably connected to the second connecting rod, and the floating body is mounted on the second connecting rod.

14. The water surface floating type electromagnetic wave signal relay device according to claim 9, wherein each of the floating units comprises a connecting rod and a floating body, wherein the connecting rod comprises a first connecting rod and a second connecting rod, one end of the first connecting rod is assembled on the first waterproof housing of the central processing mechanism, one end of the first connecting rod is axially movable, the other end of the connecting rod is rotatably connected to the second connecting rod, and the floating body is mounted on the second connecting rod.

15. The water surface floating type electromagnetic wave signal relay device according to claim 12, wherein each of the second connecting rods is composed of a long rod and a short rod which are integrally connected, the second connecting rod is L-shaped, an end portion of the short rod is rotatably connected to the first connecting rod, and the floating body is mounted on a rod body of the long rod.

16. The water surface floating type electromagnetic wave signal relay device according to claim 12, wherein a rotation limit portion is provided on at least one of connecting ends between the first connecting rods and the second connecting rods; and the rotation limit portion is configured to limit the rotation range of the second connecting rod, so as to enable the second connecting rod of each floating unit to freely swing up and down correspondingly with the undulation of sea waves.

17. The water surface floating type electromagnetic wave signal relay device according to claim 12, wherein connecting rod mounting structures are provided on a peripheral surface of the first waterproof housing of the central processing mechanism; each of the connecting rod mounting structures comprises a plug-in seat and a locking buckle, wherein the plug-in seat is provided with a horizontal plug-in hole, and one end of the first connecting rod is movably assembled in the horizontal plug-in hole; the locking buckle is mounted on the plug-in seat in a seesawing manner, a spring is arranged at one end of the locking buckle, and two ends of the spring are respectively connected to the locking buckle and the plug-in seat; the other end of the locking buckle extends to the front of the horizontal plug-in hole; each of the first connecting rods is at least provided with a first locking position and a second locking position; and when the first connecting rod moves to be in a storage state and a use state, the other end of the locking buckle is separately stuck in the first locking position and the second locking position.

18. The water surface floating type electromagnetic wave signal relay device according to claim 12, wherein the floating bodies are inflatable airbags, an upper sealing plate and an upper support plate are arranged at an upper end of each of the inflatable airbags, the upper sealing plate and the upper support plate are airtightly connected to each other, and the upper sealing plate and the upper support plate are airtightly connected to an outer surface and an inner surface of the upper end of the inflatable airbag, respectively; a lower sealing plate and a lower support plate are arranged at a lower end of each of the inflatable airbags, the lower sealing plate and the lower support plate are airtightly connected to each other, and the lower sealing plate and the lower support plate are airtightly connected to an outer surface and an inner surface of the lower end of the inflatable airbag, respectively; and the upper sealing plate is connected to the second connecting rod.

19. The water surface floating type electromagnetic wave signal relay device according to claim 18, wherein the inflatable airbags are accordion type airbags, and the thicknesses of the folded parts of the inflatable airbags are smaller than those of the non-folded parts.

20. The water surface floating type electromagnetic wave signal relay device according to claim 2, wherein the underwater signal cable mechanism comprises a cable and a cable adjustment member, wherein the cable adjustment member comprises a telescopic connecting piece and a cable adjustment sleeve, one end of the telescopic connecting piece is connected to the first waterproof housing of the central processing mechanism, and the other end of the telescopic connecting piece is connected to the cable adjustment sleeve; and the cable is in a coiled state, one end of the cable is connected to the control circuit board in the first waterproof housing, and the other end of the cable is flexibly threaded through the cable adjustment sleeve.

* * * * *